US011667992B2

(12) United States Patent
Dellis et al.

(10) Patent No.: US 11,667,992 B2
(45) Date of Patent: Jun. 6, 2023

(54) TIP FOR INTERFACE CONES

(71) Applicant: AGILENT TECHNOLOGIES, INC., Santa Clara, CA (US)

(72) Inventors: James Dellis, Melborne (AU); Lawrence McCanney, Burlington City, NJ (US); Gareth Pearson, Melborne (AU)

(73) Assignee: AGILENT TECHNOLOGIES, INC., Santa Clara, CA (US)

( * ) Notice: Subject to any disclaimer, the term of this patent is extended or adjusted under 35 U.S.C. 154(b) by 0 days.

(21) Appl. No.: 17/379,579

(22) Filed: Jul. 19, 2021

(65) Prior Publication Data
US 2023/0013904 A1 Jan. 19, 2023

(51) Int. Cl.
*C22C 5/04* (2006.01)
*H01J 49/06* (2006.01)

(52) U.S. Cl.
CPC .............. *C22C 5/04* (2013.01); *H01J 49/067* (2013.01)

(58) Field of Classification Search
CPC .................................... C22C 5/04; C22F 1/14
See application file for complete search history.

(56) References Cited

U.S. PATENT DOCUMENTS

| | | | |
|---|---|---|---|
| 5,229,605 | A | 7/1993 | Bridenne et al. |
| 5,793,039 | A | 8/1998 | Oishi et al. |
| 5,977,541 | A | 11/1999 | Miyazawa et al. |
| 6,248,998 | B1 | 6/2001 | Okumoto et al. |
| 6,528,018 | B1 | 3/2003 | Berndt |
| 6,703,610 | B2 | 3/2004 | Mordehai |
| 7,009,176 | B2 | 3/2006 | Thakur |
| 7,335,877 | B1 | 2/2008 | Han et al. |
| 7,741,600 | B2 | 6/2010 | Wouters et al. |
| 7,786,452 | B2 | 8/2010 | Wards et al. |
| 9,202,679 | B2 | 12/2015 | Kalinitchenko |
| 9,305,758 | B2 | 4/2016 | Kalinitchenko |
| 10,033,163 | B1* | 7/2018 | Sumoyama ............ H01T 21/02 |
| 10,290,482 | B1 | 5/2019 | Yamada et al. |
| 10,337,998 | B2 | 7/2019 | Jevtic et al. |
| 10,446,382 | B2 | 10/2019 | Syms |
| 10,854,438 | B2 | 12/2020 | Yamada et al. |
| 2006/0076482 | A1 | 4/2006 | Hobbs et al. |
| 2019/0279858 | A1 | 9/2019 | Taniguchi et al. |
| 2020/0135443 | A1 | 4/2020 | Itagaki et al. |
| 2020/0144042 | A1 | 5/2020 | Badiei et al. |
| 2021/0142995 | A1 | 5/2021 | Asahi |

FOREIGN PATENT DOCUMENTS

| | | |
|---|---|---|
| CN | 2510862 | 9/2002 |
| CN | 108091543 | 5/2018 |
| CN | 110161110 | 8/2019 |
| CN | 110389166 | 10/2019 |
| CN | 111223745 | 6/2020 |
| CN | 111223750 | 6/2020 |
| CN | 111337564 | 6/2020 |
| EP | 0446080 | 9/1991 |
| GB | 2470288 | 11/2010 |
| JP | H07240169 | 9/1995 |
| JP | H09092200 | 9/1995 |
| JP | H08115702 | 5/1996 |
| JP | H08287865 | 11/1996 |
| JP | 2000067803 | 3/2000 |
| JP | 4524834 | 8/2001 |
| JP | 2002008584 | 1/2002 |
| JP | 3369325 | 1/2003 |
| JP | 3521218 | 4/2004 |
| JP | 2005276744 | 10/2005 |
| JP | 4060050 | 3/2008 |
| JP | 05258711 | 8/2013 |
| JP | 2014107012 | 6/2014 |
| JP | 6075320 | 11/2015 |
| JP | 6380077 | 6/2016 |
| JP | 6167969 | 7/2017 |
| WO | WO 2005/062340 | 7/2005 |
| WO | WO 2010/130997 | 11/2010 |
| WO | WO 2010/130998 | 11/2010 |
| WO | WO 2010/131005 | 11/2010 |
| WO | WO 2010/131007 | 11/2010 |
| WO | WO 2018/163576 | 9/2018 |
| WO | WO 2021/106277 | 6/2021 |

* cited by examiner

*Primary Examiner* — Jessee R Roe
(74) *Attorney, Agent, or Firm* — Mannava & Kang, P.C.; Carol L. Bunner

(57) ABSTRACT

A tip including an alloy of platinum and an alloying element chosen from gold, palladium, ruthenium, osmium, iron, cobalt, nickel, copper, zinc, silver, chromium, manganese, titanium, niobium, scandium, vanadium, yttrium, zirconium, molybdenum, tantalum, tungsten, technetium, cadmium, hafnium, rhenium, less than 5 wt. % of iridium, less than 5 wt. % of rhodium, greater than 20 wt. % iridium, greater than 20 wt. % rhodium, and a combination thereof, relative to the total weight of the alloy is disclosed. An interface cone can include a base and the tip.

20 Claims, 3 Drawing Sheets

Table 1.

| Alloy | Mechanical Properties | | | | Physical Properties | | | |
|---|---|---|---|---|---|---|---|---|
| | Vickers [HV] | YS [MPa] | UTS [MPa] | A [%] | E [GPa] | Coefficient of Expansion [10-6/K] (20-1000° C) | Electr. Resist. [Ωmm²/2mm] | Thermal Conduct. [W/(mxK)] | Melting Point [C] |
| Comp. Ex. 1 | PtRh10 | 90 | 130 | 310 | 37 | 210 | 9.8 | 0.2 | 90 | 1840-1850 |
| Comp. Ex. 2 | Pt | 43 | 50 | 160 | 44 | 170 | 10.3 | 0.107 | 74 | 1770 |
| Example 1 | PtRh5 | 65 | 115 | 250 | 35 | 190 | 10.3 | 0.173 | 46 | 1810-1820 |
| Example 2 | PtIr10 | 120 | 240 | 360 | 29 | 205 | 8.4 | 0.24 | 31 | 1780-1800 |
| Example 3 | PtIr5 | 85 | 150 | 250 | 26 | 190 | 9.2 | 0.198 | 30 | 1770 |
| Example 4 | PtAu5 | 100 | 200 | 350 | 23 | 180 | | 0.183 | | 1740-1770 |

*FIG. 3*

Table 2.

| Material | Solidus Temp. °C | Liquidus Temp. °C | Density Gm/cc | Annealed Hardness HV | Annealed Tensile Strength PSI | Annealed Tensile Strength Mpa | Hard Hardness HV | Hard Tensile Strength PSI | Hard Tensile Strength Mpa |
|---|---|---|---|---|---|---|---|---|---|
| Platinum 100% | 1770 | 1770 | 21.45 | 40 | 27000 | 185 | 100 | 55000 | 300 |
| Pt - 5% cobalt | 1750 | 1765 | 20.02 | 135 | 64000 | 440 | - | 100000 | 690 |
| Pt - 5% copper | 1740 | 1750 | 20.05 | 90 | 55000 | 380 | - | 82000 | 565 |
| Pt - 5% gold | 1700 | 1780 | 21.33 | 90 | 50000 | 345 | - | 65000 | 450 |
| Pt - 5% iridium | 1700 | 1790 | 21.5 | 80 | 39000 | 275 | 150 | 69000 | 475 |
| Pt - 5% nickel | 1750 | 1780 | 20.04 | 135 | 65000 | 450 | - | 103000 | 710 |
| Pt - 5% palladium | 1750 | 1780 | 20.84 | 70 | 37000 | 255 | 125 | - | - |
| Pt - 5% rhodium | 1780 | 1820 | 20.70 | 70 | 38000 | 260 | 140 | 78000 | 540 |
| Pt - 5% ruthenium | 1780 | 1795 | 20.67 | 130 | 60000 | 415 | 230 | 110000 | 790 |
| Pt - 5% tungsten | 1780 | 1800 | 21.33 | 140 | 78000 | 540 | 240 | 120000 | 835 |

FIG. 4

TIP FOR INTERFACE CONES

FIELD OF THE INVENTION

The present disclosure generally relates to a tip including an alloy of platinum and an alloying element chosen from gold, palladium, ruthenium, osmium, iron, cobalt, nickel, copper, zinc, silver, chromium, manganese, titanium, niobium, scandium, vanadium, yttrium, zirconium, molybdenum, tantalum, tungsten, technetium, cadmium, hafnium, rhenium, less than 5 wt. % of iridium, less than 5 wt. % of rhodium, greater than 20 wt. % iridium, greater than 20 wt. % rhodium, and a combination thereof, relative to the total weight of the alloy. An interface cone can include a base and the tip.

BACKGROUND OF THE INVENTION

Interface cones, which are composed of sampler and skimmer cones, of an Inductively Coupled Plasma-Mass Spectrometer (ICP-MS) transport ions from the plasma to the mass spectrometer. The tip areas of the interface cones are subjected to highly corrosive acids at high temperatures (about 1000° C. near the orifice). An interface cone can include a tip and a base.

For both the sampler and skimmer cone, the tip can be made of nickel or platinum. The nickel tip is a standard economic option suitable for most applications. The platinum tip, which is actually an alloy of platinum (about 90 wt. %) and rhodium (about 10 wt. %), is more expensive, but is required for aggressive acids, and is used in the semiconductor industry. The platinum tip can come in different sizes, but the larger sizes increase the expense.

For the sampler cone, the base material can be copper due to its excellent thermal conductivity. In another aspect, the sampler cone includes a nickel base with a platinum tip (90 wt. % platinum, 10 wt. % rhodium).

For the skimmer cone, the base material can also be nickel or copper with the platinum tip (90 wt. % platinum, 10 wt. % rhodium).

As the price for rhodium increases, what is needed is a cheaper alternative for the current platinum tip without a change in performance and/or durability of the platinum tip. Additionally, a platinum tip can include the same design and/or manufacturing process, but with a different alloy composition. For example, the platinum tip can include the same dimensions and/or geometry in order to avoid any expenses related to manufacturing of the tip, and/or use of the tip.

BRIEF DESCRIPTION OF THE DRAWINGS

Features of the present disclosure are illustrated by way of example and not limited in the following figure(s), in which like numerals indicate like elements, in which:

FIG. 3 is a table illustrating mechanical and physical properties of a tip; and

FIG. 4 is a table illustrating mechanical and physical properties of a tip.

SUMMARY OF THE INVENTION

Figure 1:
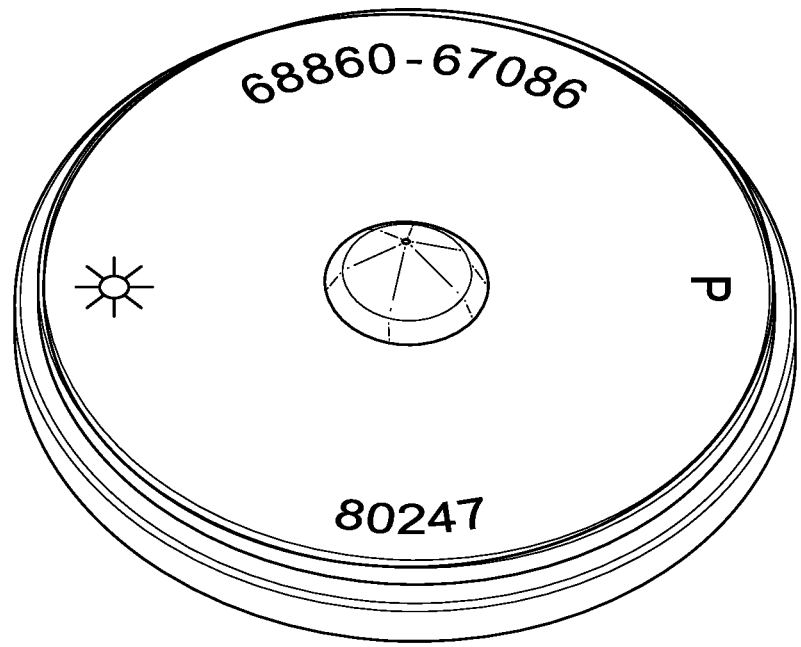
FIG. 1 is a tip according to an aspect of the invention.

In an aspect, there is disclosed a tip including an alloy of platinum and an alloying element chosen from gold, palladium, ruthenium, osmium, iron, cobalt, nickel, copper, zinc, silver, chromium, manganese, titanium, niobium, scandium, vanadium, yttrium, zirconium, molybdenum, tantalum, tungsten, technetium, cadmium, hafnium, rhenium, less than 5 wt. % of iridium, less than 5 wt. % of rhodium, greater than 20 wt. % iridium, greater than 20 wt. % rhodium, and a combination thereof, relative to the total weight of the alloy.

Additional features and advantages of various embodiments will be set forth, in part, in the description that follows, and will, in part, be apparent from the description, or can be learned by the practice of various embodiments. The objectives and other advantages of various embodiments will be realized and attained by means of the elements and combinations particularly pointed out in the description herein.

DETAILED DESCRIPTION OF THE INVENTION

For simplicity and illustrative purposes, the present disclosure is described by referring to examples thereof. In the following description, numerous specific details are set forth in order to provide a thorough understanding of the present disclosure. It will be readily apparent however, that the present disclosure may be practiced without limitation to these specific details. In other instances, some methods and structures have not been described in detail so as not to unnecessarily obscure the present disclosure.

Additionally, the elements depicted in the accompanying figures may include additional components and some of the components described in those figures may be removed and/or modified without departing from scopes of the present disclosure. Further, the elements depicted in the figures may not be drawn to scale and thus, the elements may have sizes and/or configurations that differ from those shown in the figures. Any references to "top" or "bottom" are for ease of understanding positions relative to another element and should not be considered limiting. Additionally, if more than one element is present, then the element is identified as a first, second, third, etc. for ease of understanding.

In its broad and varied embodiments, disclosed herein is a tip, and an interface cone; and methods of making and using the tip, and the interface cones. The tip can include an alloy of platinum and an alloying element chosen from gold, palladium, ruthenium, osmium, iron, cobalt, nickel, copper, zinc, silver, chromium, manganese, titanium, niobium, scandium, vanadium, yttrium, zirconium, molybdenum, tantalum, tungsten, technetium, cadmium, hafnium, rhenium, less than 5 wt. % of iridium, less than 5 wt. % of rhodium, greater than 20 wt. % iridium, greater than 20 wt. % rhodium, and a combination thereof, relative to the total weight of the alloy.

The alloy can include platinum in a major amount. As used herein "major" is understood as greater than about 50 wt. %, relative to the total weight of the alloy. In an aspect, platinum can be present in the alloy in an amount ranging from about 80 wt. % to about 97 wt. %, for example, from about 85 wt. % to about 95 wt. %, and as a further example, from about 87 wt. % to about 93 wt. %, relative to the total weight of the alloy. The alloy can include from greater than about 50 wt. % to less than about 100 wt. % of platinum, relative to the total weight of the alloy, including all amounts in between. The platinum can be an isotope chosen from platinum 194, platinum 195, platinum 198, and a combination thereof.

As used herein, an "alloy" is a composite of two or more elements, one of which is a metal; and the composite exhibits properties that are different from the properties of the individual elements. For example, an alloy can have greater hardness or strength as compared to the two individual elements alone. The alloy is more than an admixture of two elements. The alloy can be a substitutional alloy (e.g., wherein one elemental atom is replaced by another elemental atom of the same size) or an interstitial alloy (e.g., adding smaller elemental atoms into the holes of a framework or lattice of a larger elemental atom). The alloy can be a homogeneous alloy (e.g., featuring only one phase) or a heterogeneous alloy (featuring two or more phases).

The alloy can include an alloying element. In an aspect, the alloying element can be an element chosen from gold, palladium, ruthenium, osmium, iron, cobalt, nickel, copper, zinc, silver, chromium, manganese, titanium, niobium, scandium, vanadium, yttrium, zirconium, molybdenum, tantalum, tungsten, technetium, cadmium, hafnium, rhenium, less than 5 wt. % of iridium, less than 5 wt. % of rhodium, greater than 20 wt. % iridium, greater than 20 wt. % rhodium, and a combination thereof, relative to the total weight of the alloy. Other alloying elements can be used so long as: it does not increase the likelihood of background interference during use of the tip, for example, in an interface cone; is cost effective; and/or does not decrease the lifetime use of the tip. Additionally, elements that can be used as the alloying element with platinum include tantalum, tungsten, molybdenum, and combinations thereof. The alloying element can provide an increase in a lifetime of an interface cone.

In addition to the platinum, the alloy can include iridium as the alloying element. The iridium can be present in the alloy in an amount less than about 5 wt. %, for example, in an amount ranging from about 0.05 wt. % to about 4.99 wt. %, and as a further example, from about 2 wt. % to about 4 wt. %, relative to the total weight of the alloy, including all amounts in between. In an aspect, iridium can be present in the alloy in an amount greater than about 20 wt. %, for example, greater than about 21 wt. %, and as a further example, from about 21 wt. % to about 99.99 wt. %, relative to the total weight of the alloy. The alloy can be platinum and iridium.

The alloy can be platinum and less than 5 wt. % of iridium, relative to the total weight of the alloy. The alloy can be from about 95.1 wt. % to about 99.95 wt. % of platinum and from about 0.05 wt. % to about 4.99 wt. % iridium, relative to the total weight of the alloy. In an aspect, the alloy can be from about 96 wt. % to about 98 wt. % platinum and from about 2 wt. % to about 4 wt. % iridium, relative to the total weight of the alloy. In another aspect, the alloy can be about 96 wt. % platinum and about 4 wt. % iridium, relative to the total weight of the alloy.

In addition to the platinum, the alloy can include gold as the alloying element. The gold can be present in the alloy in an amount ranging from greater than about 0.0001 wt. % to less than about 30 wt. %, relative to the total weight of the alloy, including all amounts in between. In an aspect, gold can be present in the alloy in an amount ranging from about 3 wt. % to about 20 wt. %, for example, from about 5 wt. % to about 13 wt. %, and as a further example from about 5 wt. % to about 10 wt. %, relative to the total weight of the alloy. The alloy can be platinum and gold.

The alloy can be from about 80 wt. % to about 97 wt. % of platinum and from about 3 wt. % to about 20 wt. % gold, relative to the total weight of the alloy. In another aspect, the alloy is about 95 wt. % platinum and about 5 wt. % gold, relative to the total weight of the alloy.

In addition to the platinum, the alloy can include rhodium as the alloying element. The rhodium can be present in the alloy in an amount less than 5 wt. %, such as from about 0.00001 wt. % to about 5 wt. % relative to the total weight of the alloy, including all amounts in between. In an aspect, rhodium can be present in the alloy in an amount ranging from about 0.00001 wt. % to about 5 wt. %, for example, from about 1 wt. % to about 4.5 wt. %, and as a further example from about 1.5 wt. % to about 4 wt. %, relative to the total weight of the alloy. The alloy can be platinum and less than 5 wt. % of rhodium, relative to the total weight of the alloy.

The alloy can be from about 95 wt. % to about 99.9999 wt. % of platinum and from about 0.00001 wt. % to about 5 wt. % rhodium, relative to the total weight of the alloy. In another aspect, the alloy is about 95 wt. % platinum and about 5 wt. % rhodium, relative to the total weight of the alloy.

In an aspect, the rhodium can be present in the alloy in an amount greater than about 20 wt. %, such as from about 20.6 wt. % to about 99.9999 wt. % relative to the total weight of the alloy, including all amounts in between. In an aspect, rhodium can be present in the alloy in an amount ranging from about 21 wt. % to about 95 wt. %, for example, from about 25 wt. % to about 90 wt. %, and as a further example from about 30 wt. % to about 80 wt. %, relative to the total weight of the alloy. The alloy can be platinum and greater than about 20 wt. % of rhodium, relative to the total weight of the alloy.

The alloy can be platinum and tungsten. The tungsten can be an isotope chosen from tungsten 182, tungsten 183, and a combination thereof. The tungsten can be present in the alloy in an amount ranging from greater than about 0.0001 wt. % to less than about 40 wt. %, relative to the total weight of the alloy, including all amounts in between. In an aspect, tungsten can be present in the alloy in an amount ranging from about 3 wt. % to about 30 wt. %, for example, from about 5 wt. % to about 20 wt. %, and as a further example from about 5 wt. % to about 15 wt. %, relative to the total weight of the alloy.

The alloy can be platinum and ruthenium. The ruthenium can be an isotope chosen from ruthenium 99, ruthenium 101, and a combination thereof. The ruthenium can be present in the alloy in an amount ranging from greater than about 0.0001 wt. % to less than about 40 wt. %, relative to the total weight of the alloy, including all amounts in between. In an aspect, ruthenium can be present in the alloy in an amount ranging from about 3 wt. % to about 30 wt. %, for example, from about 5 wt. % to about 20 wt. %, and as a further example from about 5 wt. % to about 15 wt. %, relative to the total weight of the alloy.

The alloy can be platinum and nickel. The nickel can be an isotope chosen from nickel 60, nickel 61, nickel 62, and a combination thereof. The nickel can be present in the alloy in an amount ranging from greater than about 0.0001 wt. % to less than about 40 wt. %, relative to the total weight of the alloy, including all amounts in between. In an aspect, nickel can be present in the alloy in an amount ranging from about 3 wt. % to about 30 wt. %, for example, from about 5 wt. % to about 20 wt. %, and as a further example from about 5 wt. % to about 15 wt. %, relative to the total weight of the alloy.

The alloy can be platinum and vanadium. The vanadium can be an isotope chosen from vanadium 51. The vanadium can be present in the alloy in an amount ranging from greater than about 0.0001 wt. % to less than about 40 wt. %, relative to the total weight of the alloy, including all amounts in between. In an aspect, vanadium can be present in the alloy in an amount ranging from about 3 wt. % to about 30 wt. %, for example, from about 5 wt. % to about 20 wt. %, and as a further example from about 5 wt. % to about 15 wt. %, relative to the total weight of the alloy.

The alloy can be platinum and molybdenum. The molybdenum can be an isotope chosen from is molybdenum 95, molybdenum 97, and a combination thereof. The molybdenum can be present in the alloy in an amount ranging from greater than about 0.0001 wt. % to less than about 40 wt. %, relative to the total weight of the alloy, including all amounts in between. In an aspect, molybdenum can be present in the alloy in an amount ranging from about 3 wt. % to about 30 wt. %, for example, from about 5 wt. % to about 20 wt. %, and as a further example from about 5 wt. % to about 15 wt. %, relative to the total weight of the alloy.

Figure 2:
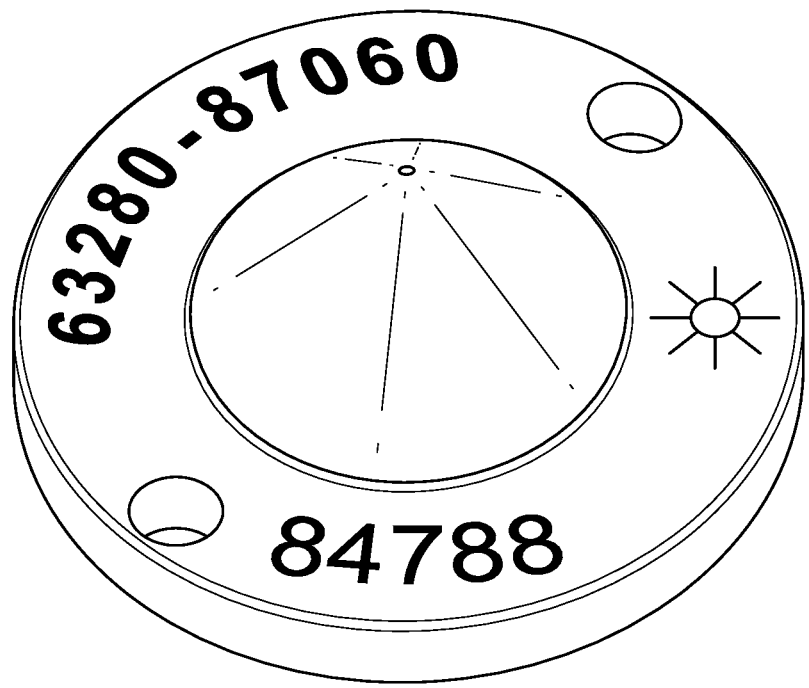
FIG. 2 is a tip according to another aspect of the invention.

FIG. 1 illustrates a 12 mm sampler cone with a tip and a copper base. FIG. 2 illustrates a skimmer cone with a tip and a copper base.

The tip can be subjected to corrosive acids at a temperature of about 1000° C. For this reason, the tip can include an alloy having a melting temperature greater than about 1000° C., for example, greater than 1700° C., as a further example, greater than about 1740° C., and as a further example, greater than about 1780° C.

Also disclosed herein, is an interface cone including a base; and a tip. In an aspect, an entire surface of the tip can be coated with the multilayer coating. In another aspect, less than 100% of the surface of the tip can be coated with a multilayer coating. In an aspect, an entire surface of the base can be coated with a multilayer coating. In another aspect, less than 100% of the surface of the base can be coated with a multilayer coating. In a further aspect, the entire surface of both the base and the tip can be coated with a multilayer coating. In another aspect, less than 100% of the surface of each of the base and the tip can be coated with a multilayer coating. The multilayer coating can provide additional protection, such as from high temperature, from corrosive acids, etc.

The multilayer coating can include a diffusion barrier layer. The diffusion barrier layer can be made of at least one material chosen from electrolytic nickel, electroless nickel, and combinations thereof.

The multilayer coating can include an adhesion layer.

The base can be made of at least one material chosen from copper and nickel. The tip can be made of at least one material chosen from nickel and platinum. In an aspect, the interface cone can include a base made of copper, and a tip made of platinum.

Examples

FIG. 3 is a table (Table 1), which identifies some mechanical and physical properties for consideration in the tip. Comparative Example 1 is the known platinum tip of 90 wt. % platinum and 10 wt. % rhodium. Comparative example 2 is 100 wt. % of platinum. Examples 1-4 are inventive alloys.

FIG. 4 is a table (Table 2), which compares some mechanical and physical properties of platinum alloys, in which the alloying element is 5 wt. %, relative to the total weight of the alloy. The platinum alloys can be compared against a pure platinum, i.e., line 1 of Table 2.

From the foregoing description, those skilled in the art can appreciate that the present teachings can be implemented in a variety of forms. Therefore, while these teachings have been described in connection with particular embodiments and examples thereof, the true scope of the present teachings should not be so limited. Various changes and modifications can be made without departing from the scope of the teachings herein.

This scope disclosure is to be broadly construed. It is intended that this disclosure disclose equivalents, means, systems and methods to achieve the devices, activities and mechanical actions disclosed herein. For each device, article, method, mean, mechanical element or mechanism disclosed, it is intended that this disclosure also encompass in its disclosure and teaches equivalents, means, systems and methods for practicing the many aspects, mechanisms and devices disclosed herein. Additionally, this disclosure regards an article, such as a tip, and its many aspects, features and elements. This disclosure is intended to encompass the equivalents, means, systems and methods of the use of the tip and/or an interface cone and its many aspects consistent with the description and spirit of the operations and functions disclosed herein. The claims of this application are likewise to be broadly construed. The description of the inventions herein in their many embodiments is merely exemplary in nature and, thus, variations that do not depart from the gist of the invention are intended to be within the scope of the invention. Such variations are not to be regarded as a departure from the spirit and scope of the invention.

What is claimed is:

1. A tip, comprising:
an alloy of platinum and an alloying element chosen from gold, palladium, ruthenium, osmium, iron, cobalt, nickel, copper, zinc, silver, chromium, manganese, titanium, niobium, scandium, vanadium, yttrium, zirconium, molybdenum, tantalum, tungsten, technetium, cadmium, hafnium, rhenium, less than 5 wt. % of iridium, less than 5 wt. % of rhodium, greater than 20 wt. % iridium, greater than 20 wt. % rhodium, and a combination thereof, relative to the total weight of the alloy; and
wherein the tip has an opening at an apex.

2. The tip of claim 1, wherein the platinum is platinum 194, platinum 195, platinum 198, or a combination thereof.

3. The tip of claim 1, wherein the alloy is platinum and less than 5 wt. % of iridium.

4. The tip of claim 1, wherein the alloy is from about 95.1 wt. % to about 99.95 wt. % of platinum and from about 0.05 wt. % to about 4.99 wt. % iridium, relative to the total weight of the alloy.

5. The tip of claim 1, wherein the alloy is from about 96 wt. % to about 98 wt. % platinum and from about 2 wt. % to about 4 wt. % iridium, relative to the total weight of the alloy.

6. The tip of claim 1, wherein the alloy is about 96 wt. % platinum and about 4 wt. % iridium, relative to the total weight of the alloy.

7. The tip of claim 1, wherein the alloy is platinum and gold.

8. The tip of claim 1, wherein the alloy is from about 80 wt. % to about 97 wt. % of platinum and from about 3 wt. % to about 20 wt. % gold, relative to the total weight of the alloy.

9. The tip of claim 1, wherein the alloy is about 95 wt. % platinum and about 5 wt. % gold, relative to the total weight of the alloy.

10. The tip of claim 1, wherein when the alloy is platinum and ruthenium, the ruthenium is ruthenium 99, ruthenium 101, or a combination thereof.

11. The tip of claim 1, wherein when the alloy is platinum and tungsten, the tungsten is tungsten 182, tungsten 183, or a combination thereof.

12. The tip of claim 1, wherein when the alloy is platinum and nickel, the nickel is nickel 60, nickel 61, nickel 62, or a combination thereof.

13. The tip of claim 1, wherein when the alloy is platinum and vanadium, the vanadium is vanadium 51.

14. The tip of claim 1, wherein when the alloy is platinum and molybdenum, the molybdenum is molybdenum 95, molybdenum 97, or a combination thereof.

15. The tip of claim 1, wherein the alloy is from about 95 wt. % to about 99.9999 wt. % of platinum and from about 0.00001 wt. % to about 5 wt. % rhodium, relative to the total weight of the alloy.

16. The tip of claim 1, wherein the alloy is about 95 wt. % platinum and about 5 wt. % rhodium, relative to the total weight of the alloy.

17. An interface cone, comprising:
a base; and
a tip according to claim 1.

18. The interface cone of claim 17, wherein the base is made of at least one material chosen from copper or nickel.

19. The interface cone of claim 17, wherein the base is copper.

20. The interface cone of claim 17, wherein the base is nickel.

* * * * *